United States Patent
Xu

(10) Patent No.: US 12,472,672 B1
(45) Date of Patent: Nov. 18, 2025

(54) THREE-DIMENSIONAL FORMING DEVICE

(71) Applicant: Shizan Xu, Shenzhen (CN)

(72) Inventor: Shizan Xu, Shenzhen (CN)

( * ) Notice: Subject to any disclaimer, the term of this patent is extended or adjusted under 35 U.S.C. 154(b) by 0 days.

(21) Appl. No.: 19/263,713

(22) Filed: Jul. 9, 2025

(51) Int. Cl.
*B29C 48/02* (2019.01)
*B33Y 30/00* (2015.01)

(52) U.S. Cl.
CPC .............. *B29C 48/02* (2019.02); *B33Y 30/00* (2014.12)

(58) Field of Classification Search
CPC ....................................................... B29C 48/02
See application file for complete search history.

(56) References Cited

U.S. PATENT DOCUMENTS

| | | | |
|---|---|---|---|
| 9,731,444 B2 | 8/2017 | Dllworth | |
| 11,045,990 B1* | 6/2021 | Lee | B29C 48/92 |
| 2016/0303789 A1* | 10/2016 | Bogue | B29C 48/802 |
| 2017/0095976 A1* | 4/2017 | Pedersen | B29C 64/118 |
| 2017/0151704 A1* | 6/2017 | Go | B29C 48/266 |
| 2023/0173762 A1* | 6/2023 | Aslam | B29C 64/393 425/143 |
| 2023/0311416 A1* | 10/2023 | Wei | B33Y 40/00 |
| 2024/0100764 A1* | 3/2024 | Wei | B29C 64/393 |

* cited by examiner

*Primary Examiner* — JaMel M Nelson
(74) *Attorney, Agent, or Firm* — JEEN IP LAW, LLC

(57) ABSTRACT

A three-dimensional molding device is provided, which includes a main housing, a feeding mechanism is provided in the main housing; one end of the main housing is connected to a pen head, a heating head is provided in the pen head. The feeding mechanism includes a transmission bracket and a reduction motor. One side of the transmission bracket is rotatably provided with a feeding wheel, a bearing is rotatably provided on one side of the transmission bracket close to the feeding wheel; the reduction motor is connected to the feeding wheel for transmission; an outer surface of the feeding wheel is provided with a feeding groove, and there are a plurality sets of convex points inside the feeding groove. A feeding wheel with convex points and the bearing are used to clamp and transport consumables. The convex points on the feeding wheel can effectively penetrate surfaces of the consumables.

6 Claims, 10 Drawing Sheets

THREE-DIMENSIONAL FORMING DEVICE

TECHNICAL FIELD

The present disclosure relates to the field of 3D molding technologies, and in particular, to a three-dimensional forming device.

BACKGROUND 3D printing pens have broken through the limitations of traditional writing and painting that rely on paper planes, and can quickly transform design sketches of any shape from 2D (two-dimensional) flat shapes into solid 3D (three-dimensional) objects. Its working principle is similar to that of 3D printers, usually using Polylactic Acid (PLA) or Acrylonitrile Butadiene Styrene plastic (ABS) plastic as raw materials.

At present, 3D printing pens are usually equipped with a gear driven feeding mechanism inside to transfer plastic consumables (profiles). For example, U.S. Pat. No. 9,731,444B2 adopts a structure with a plurality of sets of gears. This type of feeding mechanism has a complex structure, and more importantly, the characteristics of some consumables cause dust to be generated and adhere to the gears during a conveying process, resulting in a decrease in friction between the gears and consumables, rendering it easy to slip and affecting the stability of consumable conveying. Therefore, in view of this, research and improvement are carried out on the existing structure and deficiencies, and a three-dimensional forming device is provided to achieve more practical value.

SUMMARY

In order to solve the above technical problems, the present disclosure provides a three-dimensional molding device achieved by the following specific technical solution.

A three-dimensional forming device, including a main housing, where a feeding mechanism is provided in the main housing; one end of the main housing is connected to a pen head, and a heating head is provided inside the pen head; where the feeding mechanism includes a transmission bracket and a reduction motor; one side of the transmission bracket is rotatably provided with a feeding wheel, and a bearing is rotatably provided on one side of the transmission bracket that is close to the feeding wheel configured to clamp raw materials between the feeding wheel and the bearing; the reduction motor is connected to the feeding wheel for transmission; an outer surface of the feeding wheel is provided with a feeding groove, and an interior of the feeding groove is provided with a plurality of sets of convex points. The convex points have shapes of cones, pyramids, or other structures that can penetrate the surface of consumables and are arranged in a staggered manner.

In some embodiments of the present disclosure, the reduction motor is fixedly provided on one side of the transmission bracket, and the motor shaft of the reduction motor penetrates to the other side of the transmission bracket; a transmission shaft is fixedly provided at a center of the feeding wheel, and the other end of the transmission shaft is connected to the motor shaft for transmission.

In some embodiments of the present disclosure, an end of the motor shaft is fixedly connected to a first synchronous wheel, one end of the transmission shaft is fixedly connected to a second synchronous wheel, and a synchronous belt is connected between the second synchronous wheel and the first synchronous wheel.

In some embodiments of the present disclosure, one end of the motor shaft is fixedly connected to a first sprocket, one end of the transmission shaft is fixedly connected to a second sprocket; and a chain is connected between the second sprocket and the first sprocket.

In some embodiments of the present disclosure, one end of the main housing is fixedly provided with a heating head fixing piece, and the heating head is provided at a bottom end of the heating head fixing piece; the transmission bracket is provided in the main housing through a fastener; a bottom end of the transmission bracket is provided with a connection hole, and a guide tube is connected between the connection hole and the heating head fixing piece.

In some embodiments of the present disclosure, the main housing is composed of an upper shell and a lower shell that are spliced together; sides of the upper shell and the lower shell close to an installation position of the transmission bracket are provided with two sets of installation slots; the two sets of installation slots are combined to form an installation port, and the installation port is provided with a lens cover.

In some embodiments of the present disclosure, one side of the upper shell is provided with a lens, a control button, and a push-pull button; an inner side of the upper shell is provided with a control main board through the fastener; one side of the control main board is respectively provided with a display screen, a power switch, and a control switch corresponding to the lens, the control button, and the push-pull button.

In some embodiments of the present disclosure, the other end of the main housing is connected to a tail cover, an outer side of the tail cover is provided with a feeding hole, and a guide tube connected to the feeding hole is provided on an inner side of the tail cove.

Compared with the existing technology, the present disclosure has the following beneficial effects.

1. The present disclosure uses a feeding wheel with convex points and a bearing to clamp and transport consumables. The convex points on the feeding wheel can effectively penetrate the surface of the consumables, thereby providing a relatively stable driving force, and the bearing is used as a driven part to press the consumables. This design significantly reduces the risk of friction reduction caused by dust accumulation on the transmission surface, solves the defects of consumables slipping and unstable transportation, and ensures the reliability and consistency of feeding.

2. The present disclosure simplifies the core components of the feeding mechanism into four main parts: the reduction motor, the transmission bracket, the feeding wheel, and the bearing. A power transmission is achieved through synchronous belt/chain drive, resulting in a compact overall structure design and fewer parts, thereby effectively reducing the complexity and manufacturing cost of the mechanism. At the same time, the simplified structure also means fewer failure points, improving the overall operational reliability and service life of the equipment, and making maintenance easier.

Figure 1:
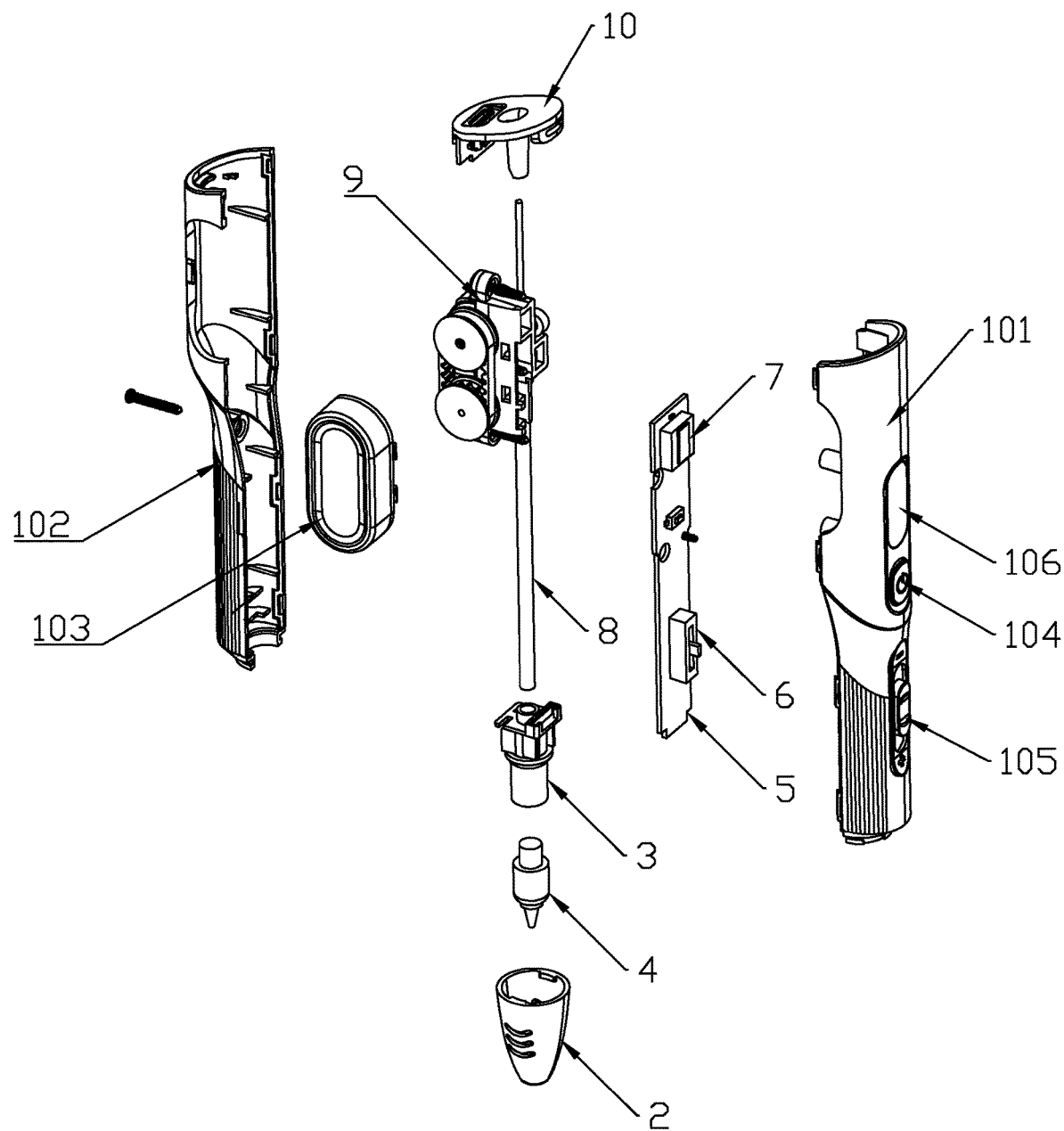
FIG. 1 is a first schematic disassembly diagram of an internal structure of a main housing of the present disclosure.
Figure 2:
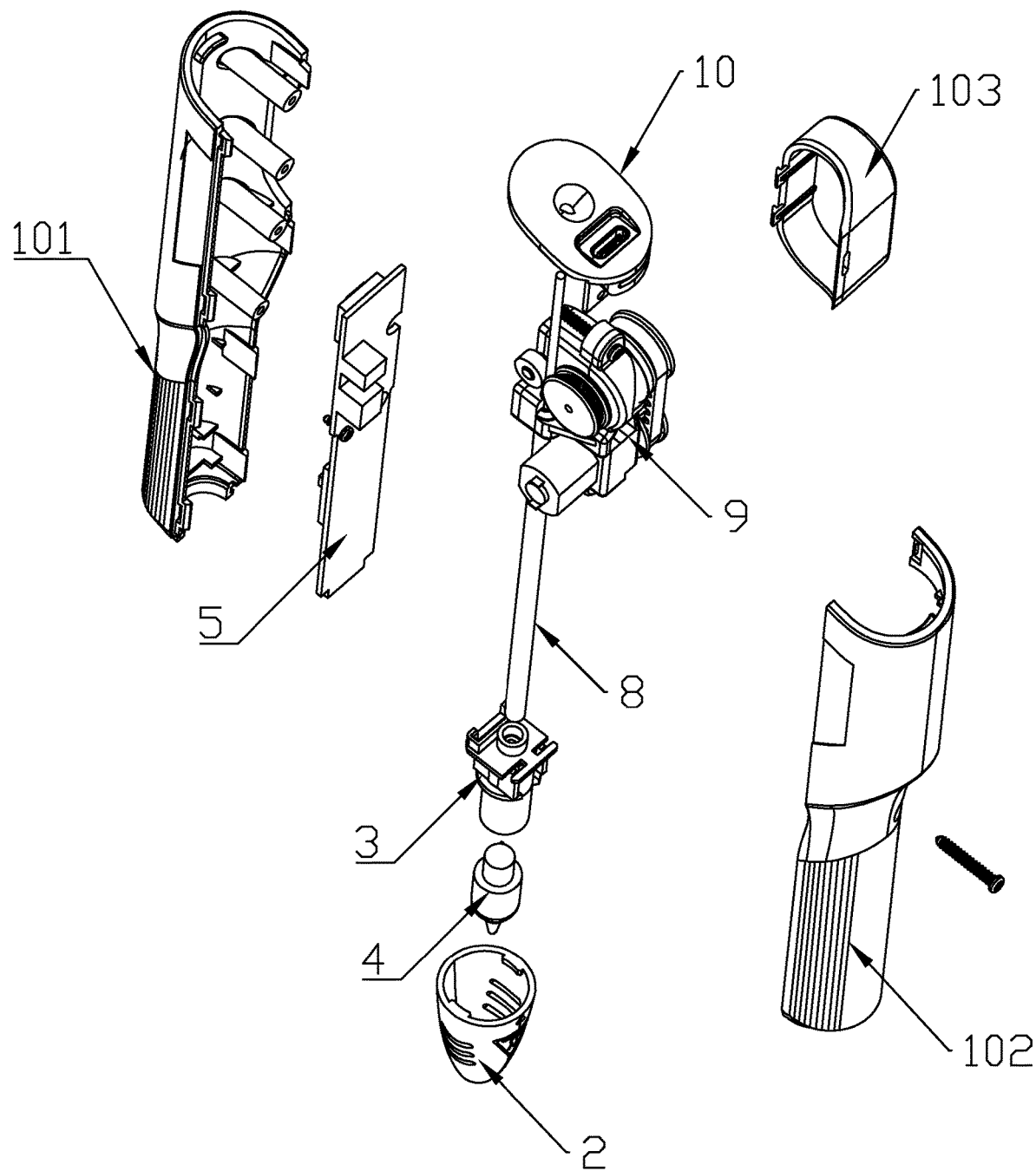
FIG. 2 is a second schematic disassembly diagram of an internal structure of the main housing of the present disclosure.
Figure 3:
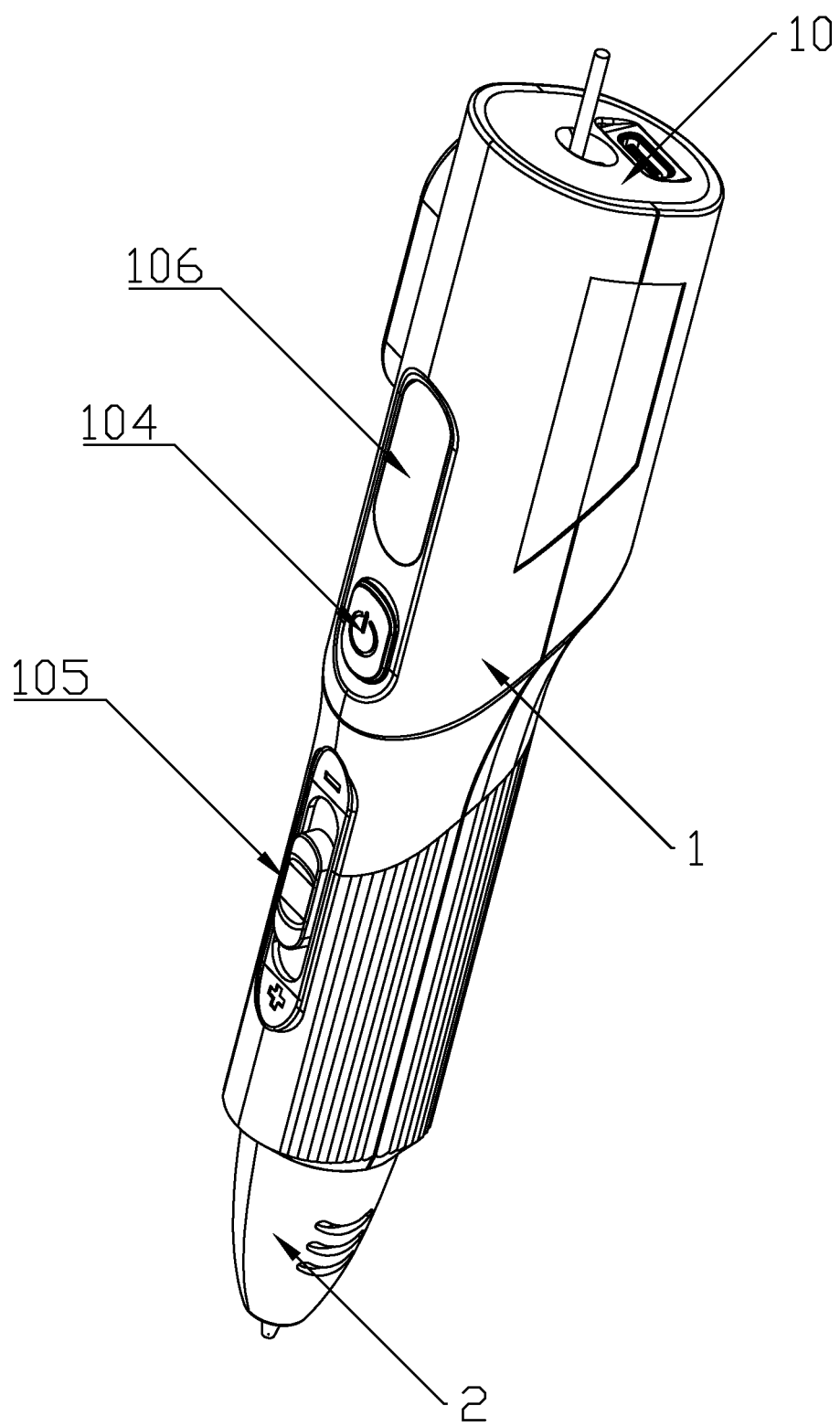
FIG. 3 is a first overall schematic diagram of the present disclosure.
Figure 4:
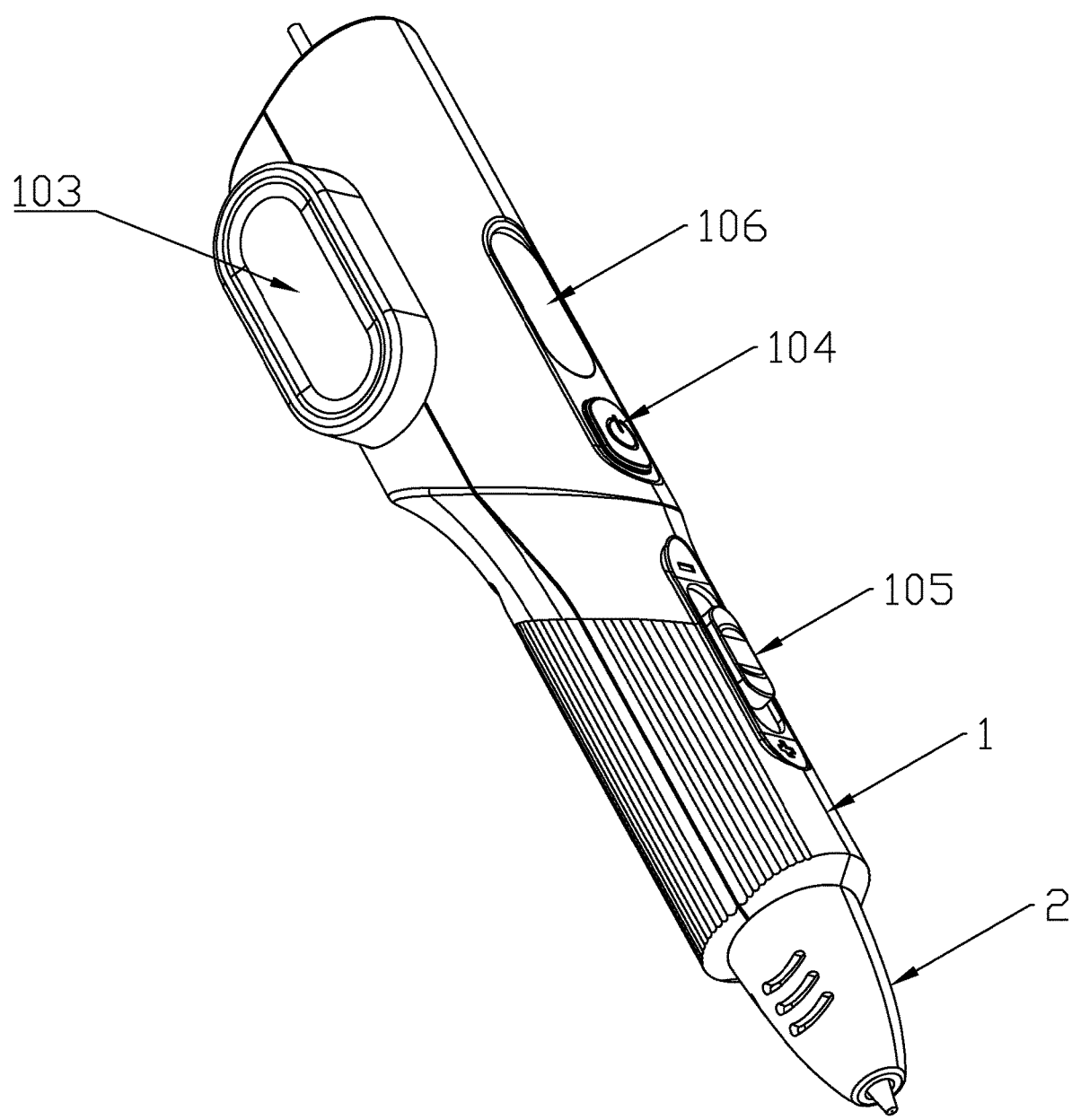
FIG. 4 is a second overall schematic diagram of the present disclosure.
Figure 5:
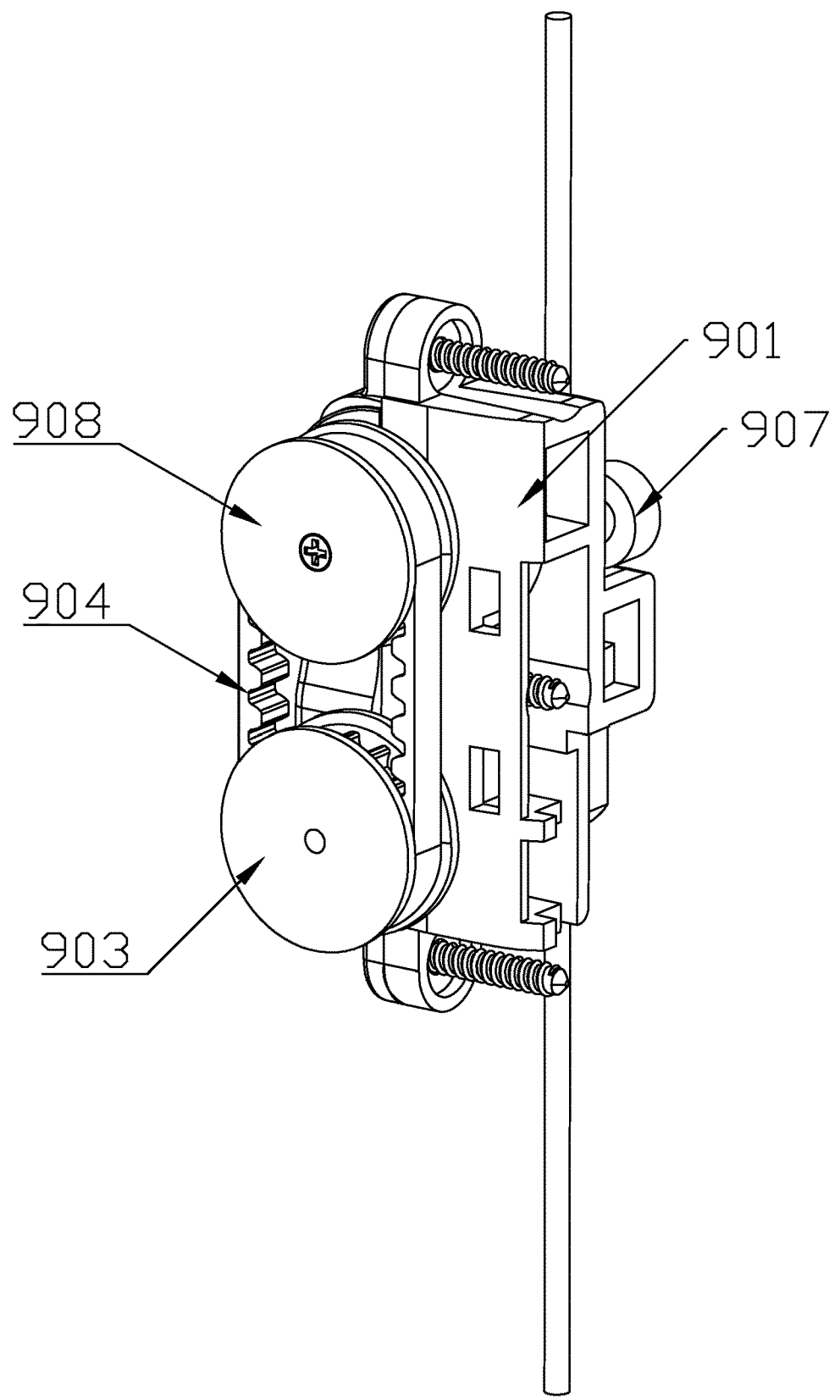
FIG. 5 is a schematic diagram of a feeding mechanism in an embodiment of the present disclosure.
Figure 6:
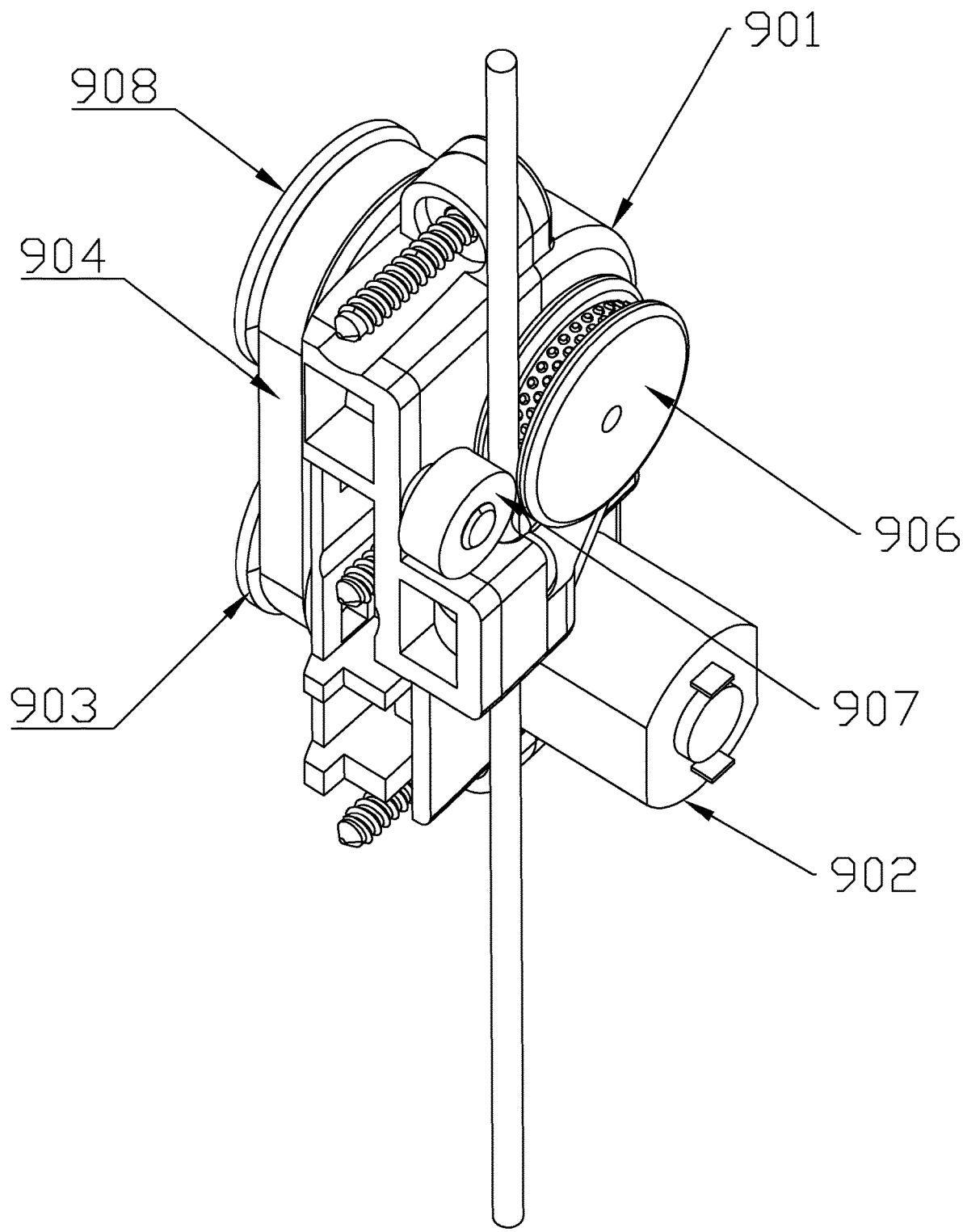
FIG. 6 is a schematic diagram of a feeding mechanism in the embodiment of the present disclosure.
Figure 7:
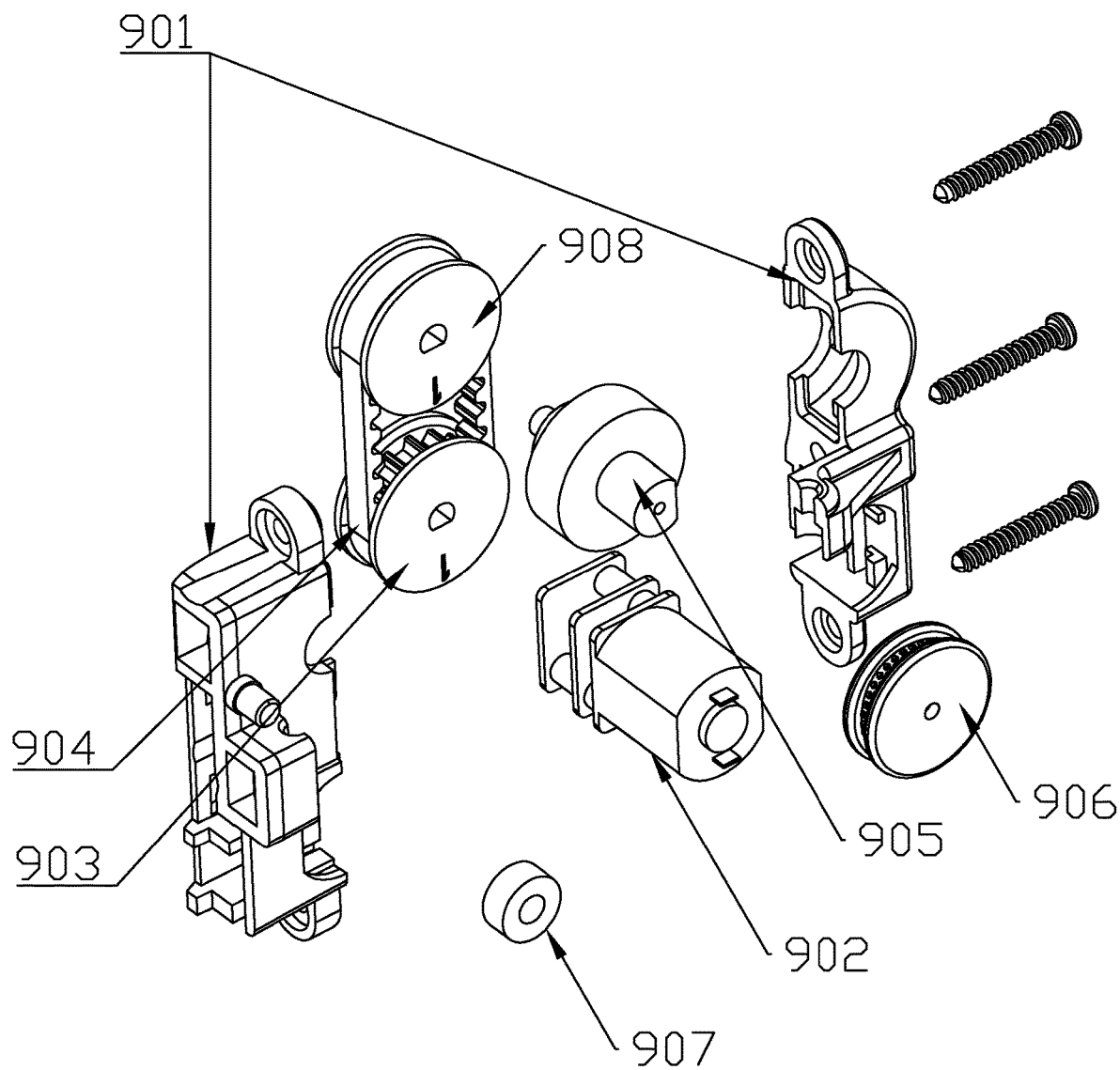
FIG. 7 is a schematic disassembly diagram of the feeding mechanism in the embodiment of the present disclosure.
Figure 8:
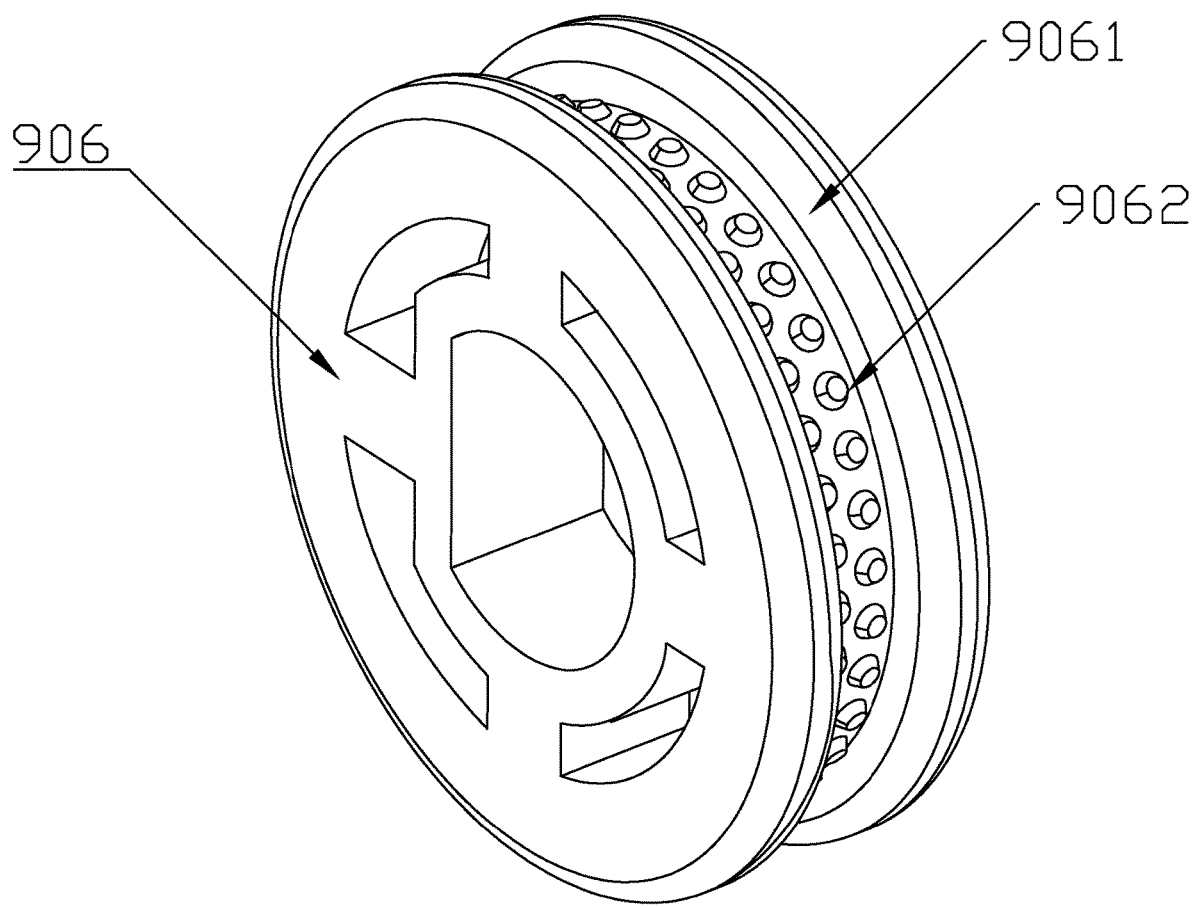
FIG. 8 is a schematic structural diagram of a feeding wheel of the present disclosure.

Numeral reference: 1—main housing; 2—pen head; 3—heating head fixing piece; 4—heating head; 5—control main board; 6—control switch; 7—display screen; 8—guide tube; 9—feeding mechanism; 10—tail cover; 101—upper shell; 102—lower shell; 103—lens cover; 104—control button; 105—push-pull button; 106—lens; 901—transmission bracket; 902—reduction motor; 903—first synchronous wheel; 904—synchronous belt; 905—transmission shaft; 906—feeding wheel; 907—bearing; 908—second synchronous wheel; 9061—feeding groove; 9062—convex point; 9031—first sprocket; 9041—chain; 9081—second sprocket.

DESCRIPTION OF EMBODIMENTS

Below, a further detailed description of the embodiments of the present disclosure will be provided in combination with the accompanying drawings and examples. The following examples are used to illustrate the present disclosure, but cannot be used to limit the scope of the present disclosure.

In a description of the present disclosure, unless otherwise specified, "a plurality of" means two or more; terms "up", "down", "left", "right", "inside", "outside", "front", "rear", "head", "tail", etc. indicate orientation or positional relationships based on the orientation or positional relationships shown in the accompanying drawings, only for a convenience of describing the present disclosure and simplifying the description, and do not indicate or imply that the device or element referred to must have a specific orientation, be constructed and operated in a specific orientation, and therefore cannot be understood as limiting the present disclosure. Furthermore, terms "first", "second", "third", etc. are only used for a descriptive purpose and cannot be understood as indicating or implying relative importance.

In a description of the present disclosure, it should be noted that unless otherwise specified and limited, terms "connected to" and "connected with" should be broadly understood, for example, it can be a fixed connection, a detachable connection, or an integral connection; it can be a mechanical connection or an electrical connection; it can be directly connected or indirectly connected through an intermediate medium. For those skilled in the art, specific meanings of the above terms in the present disclosure can be understood in specific situations.

As shown in FIGS. 1 to 8, the present disclosure provides a three-dimensional forming device including a main housing 1, a feeding mechanism 9 is provided in the main housing 1; one end of the main housing 1 is connected to a pen head 2, and a heating head 4 is provided in the pen head 2. The feeding mechanism 9 includes a transmission bracket 901 and a reduction motor 902. One side of the transmission bracket 901 is rotatably provided with a feeding wheel 906; one side of the transmission bracket 901 that is close to the feeding wheel 906 is provided with a bearing 907 configured to clamp raw materials between the feeding wheel 906 and the bearing 907. The reduction motor 902 is connected to the feeding wheel 906 for transmission; an outer surface of the feeding wheel 906 is provided with a feeding groove 9061, and an interior of the feeding groove 9061 is provided with a plurality of sets of convex points 9062. The convex points 9062 have shapes of cones, pyramids, or other structures that can penetrate the surface of consumables, and are arranged in a staggered manner to provide a relatively stable driving force and prevent slipping.

The reduction motor 902 is fixedly provided on one side of the transmission bracket 901, and a motor shaft of the reduction motor 902 is penetrated to the other side of the transmission bracket 901. A center of the feeding wheel 906 is fixedly provided with a transmission shaft 905, and the other end of the transmission shaft 905 is connected to the motor shaft for transmission. The motor shaft passes through the transmission bracket 901, and combined with the transmission shaft 905, a stable and reliable power transmission foundation is constructed to ensure that the power of the reduction motor 902 is efficiently transmitted to the feeding wheel 906.

One end of the motor shaft is fixedly connected to a first synchronous wheel 903, and one end of the transmission shaft 905 is fixedly connected to a second synchronous wheel 908. A synchronous belt 904 is connected between the second synchronous wheel 908 and the first synchronous wheel 903 to ensure the accuracy and synchronization of power transmission, rendering the consumable conveying speed more stable and controllable. Besides that, the transmission of the synchronous belt 904 further has characteristics of relatively low noise and smoother operation. At the same time, in practical application, first synchronous wheel 903 and second synchronous wheel 908 can be arranged differently, which is flexible and convenient. For example, when a diameter of the first synchronous wheel 903 is larger than that of the second synchronous wheel 908, it can achieve an effect of accelerating transmission, which is conducive to quickly driving consumables to move. When a diameter of the first synchronous wheel 903 is smaller than that of the second synchronous wheel 908, it can achieve an effect of deceleration transmission and increase the output torque, which is conducive to stable transportation of consumables.

One end of the main housing 1 is fixedly provided with a heating head fixing piece 3, and the heating head 4 is provided at a bottom end of the heating head fixing piece 3. The heating head 4 is a ceramic head, consisting of a ceramic body (with a consumable channel inside) and a heating wire. The working temperature of the heating head 4 is 200-220° C.; the pen head 2 and heating head fixing piece 3 are made of high-temperature resistant PPS material, which can withstand temperatures of 260-280° C. A plurality of sets of strip-shaped heat dissipation ports are symmetrically arranged on two sides of the pen head 2. The transmission bracket 901 is provided in the main housing 1 through a fastener. A bottom end of the transmission bracket 901 is provided with a connection hole, and a guide tube 8 is connected between the connection hole and the heating head fixing piece 3. The design of the heating head fixing piece 3 and the guide tube 8 provides a smooth and fixing guide channel for consumables from the clamping point of the feeding wheel 906 and the bearing 907 to a melting zone of the heating head 4, avoiding bending or displacement of consumables during transportation, ensuring that consumables can be accurately and stably fed into the heating head 4 for melting, and guaranteeing the smoothness and forming accuracy of discharge.

The main housing 1 is composed of an upper shell 101 and a lower shell 102 spliced together, both the upper shell 101 and the lower shell 102 are provided with two sets of installation slots on one side close to an installation position of the transmission bracket 901. The two sets of installation slots are combined to form an installation port, and the installation port is provided with a lens cover 103. The splicing structure of the upper shell 101 and the lower shell 102 is convenient for assembly and internal component maintenance. The design of the lens cover 103 that is clamping mounted on the installation port provides a window for observing a working state of the internal feeding mechanism 9, rendering it convenient for a user to monitor the delivery of consumables and conduct preliminary troubleshooting (such as whether there is a clamp stuck).

One side of the upper shell 101 is provided with a lens 106, a control button 104, and a push-pull button 105. An inner side of the upper shell 101 is provided with a control main board 5 through a fastener. One side of the control main board 5 is provided with a display screen 7, a power switch, and a control switch 6 corresponding to the lens 106, the control button 104, and the push-pull button 105. The lens 106 corresponds to the display screen 7, providing the user with intuitive feedback on the operation state. The control switch 6 is a direct sliding potentiometer, with a sliding connection between the push-pull button 105 and the upper shell 101, an inner side of the push-pull button 105 is fixedly connected to a sliding handle of the control switch 6. A direct sliding potentiometer has the function of linear adjustment of a plurality of gears, which facilitates a linear adjustment of feeding and discharging speeds during use, effectively improving the usability of the equipment.

The other end of the main housing 1 is connected to a tail cover 10, an outer side of the tail cover 10 is provided with a feeding hole, and a guide tube connected to a feeding hole on an inner side of the tail cover 10. The feeding hole is matched with an inner side of the guide tube to ensure that the consumables enter the device with good initial guidance and can smoothly travel along a predetermined path to a clamping area between the feeding wheel 906 and the bearing 907, thereby avoiding bending or jamming of the consumables at the port and ensuring an initial reliability of the feeding.

Figure 9:
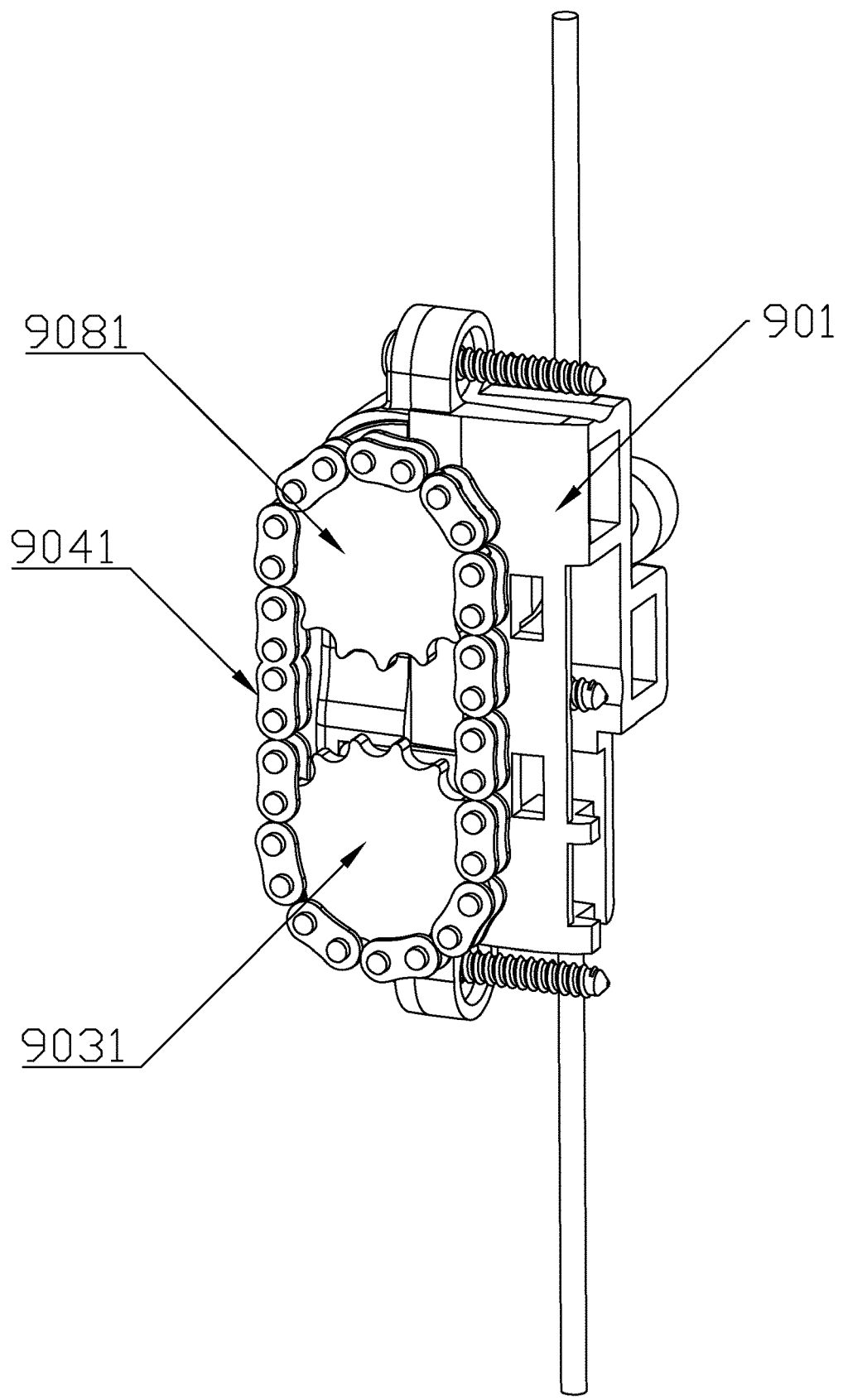
FIG. 9 is a first schematic diagram of a feeding mechanism in another embodiment of the present disclosure.
Figure 10:
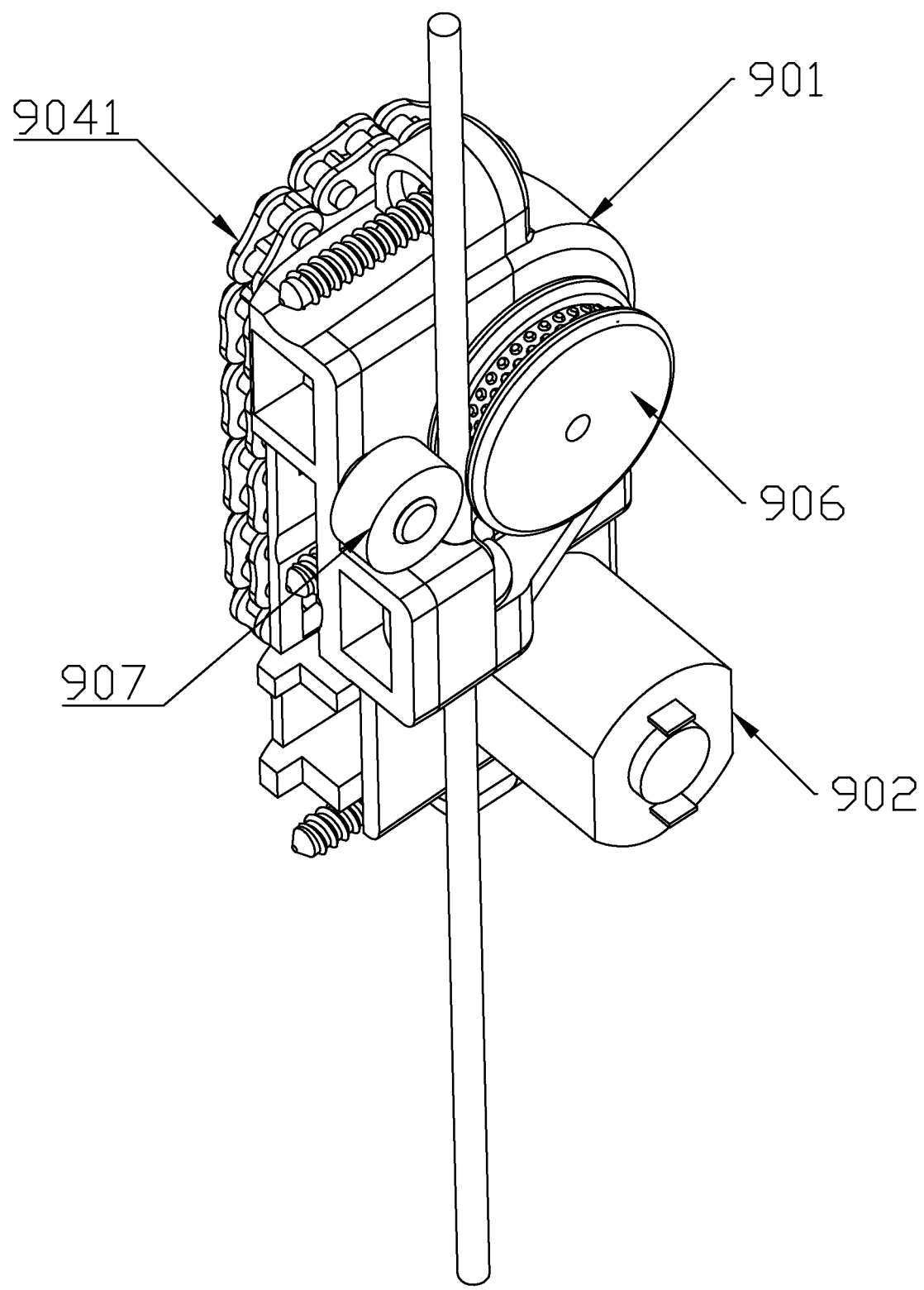
FIG. 10 is a second schematic diagram of the feeding mechanism in another embodiment of the present disclosure.

As shown in FIGS. 9 and 10, one end of the motor shaft is fixedly connected to a first sprocket 9031, and one end of the transmission shaft 905 is fixedly connected to a second sprocket 9081. A chain 9041 is connected between the second sprocket 9081 and the first sprocket 9031, which replaces the synchronous belt 904. The chain transmission can further provide stable torque transmission capability and better durability, thereby providing another reliable transmission solution for product design. At the same time, in practical application, the second sprocket 9081 and the first sprocket 9031 can be arranged differently, which is flexible and convenient.

The embodiments of the present disclosure are provided for the purpose of illustration and description, and are not exhaustive or limited to the disclosed form. Many modifications and changes are obvious to those skilled in the art. The selection and description of embodiments are to better illustrate the principles and practical applications of the present disclosure, and to enable those skilled in the art to understand the present disclosure and design various embodiments with various modifications suitable for specific purposes.

What is claimed is:

1. A three-dimensional forming device comprising; a main housing, wherein a feeding mechanism is provided in the main housing; one end of the main housing is connected to a pen head, and a heating head is provided inside the pen head;
   - wherein the feeding mechanism comprises a transmission bracket and a reduction motor;
   - one side of the transmission bracket is rotatably provided with a feeding wheel, and a bearing is rotatably provided on one side of the transmission bracket that is close to the feeding wheel configured to clamp raw materials between the feeding wheel and the bearing;
   - the reduction motor is connected to the feeding wheel for transmission;
   - an outer surface of the feeding wheel is provided with a feeding groove, and an interior of the feeding groove is provided with a plurality sets of convex points;
   - wherein a transmission shaft is fixedly provided at a center of the feeding wheel, and the other end of the transmission shaft is connected to a motor shaft for transmission;
   - wherein an end of the motor shaft is fixedly connected to a first synchronous wheel, one end of the transmission shaft is fixedly connected to a second synchronous wheel, and a synchronous belt is connected between the second synchronous wheel and the first synchronous wheel.

2. The three-dimensional forming device according to claim 1, wherein one end of the motor shaft is fixedly connected to a first sprocket,
   - one end of the transmission shaft is fixedly connected to a second sprocket;
   - and a chain is connected between the second sprocket and the first sprocket.

3. The three-dimensional forming device according to claim 1, wherein one end of the main housing is fixedly provided with a heating head fixing piece, and the heating head is provided at a bottom end of the heating head fixing piece;
   - the transmission bracket is provided in the main housing through a fastener;
   - a bottom end of the transmission bracket is provided with a connection hole, and a guide tube is connected between the connection hole and the heating head fixing piece.

4. The three-dimensional forming device according to claim 1, wherein the main housing is composed of an upper shell and a lower shell that are spliced together;
   - sides of the upper shell and the lower shell close to an installation position of the transmission bracket are provided with two sets of installation slots;
   - the two sets of installation slots are combined to form an installation port, and the installation port is provided with a lens cover.

5. The three-dimensional forming device according to claim 4, wherein one side of the upper shell is provided with a lens, a control button, and a push-pull button;
   - an inner side of the upper shell is provided with a control main board through the fastener;

one side of the control main board is respectively provided with a display screen, a power switch, and a control switch corresponding to the lens, the control button, and the push-pull button.

6. The three-dimensional forming device according to claim 1, wherein the other end of the main housing is connected to a tail cover, an outer side of the tail cover is provided with a feeding hole, and a guide tube connected to the feeding hole is provided on an inner side of the tail cover.

* * * * *